US006857197B2

(12) United States Patent
Hicks

(10) Patent No.: US 6,857,197 B2
(45) Date of Patent: Feb. 22, 2005

(54) ELECTRICAL BOX LOCATOR

(76) Inventor: Thurman B. Hicks, 12166 Black Water Rd., Baker, LA (US) 70714

( * ) Notice: Subject to any disclaimer, the term of this patent is extended or adjusted under 35 U.S.C. 154(b) by 0 days.

(21) Appl. No.: 10/657,835

(22) Filed: Sep. 9, 2003

(65) Prior Publication Data

US 2004/0049933 A1 Mar. 18, 2004

Related U.S. Application Data

(60) Provisional application No. 60/409,712, filed on Sep. 12, 2002.

(51) Int. Cl.[7] .............................................. B43L 13/00
(52) U.S. Cl. .................................... 33/528; 33/DIG. 10
(58) Field of Search ................... 33/464, 528, DIG. 10; 269/2, 86, 87, 87.2, 903, 904

(56) References Cited

U.S. PATENT DOCUMENTS

| | | | | |
|---|---|---|---|---|
| 2,990,172 A | * | 6/1961 | Gianotta | ................ 33/DIG. 10 |
| 3,522,658 A | * | 8/1970 | Howell | ......................... 33/528 |
| 3,875,669 A | | 4/1975 | Hull | |
| 3,954,717 A | * | 5/1976 | Tarr | ....................... 33/DIG. 10 |
| 4,706,359 A | * | 11/1987 | Greenhill et al. | ............ 269/904 |
| 4,850,115 A | | 7/1989 | Price et al. | .................... 33/528 |
| 4,890,391 A | | 1/1990 | Warren | ......................... 33/613 |
| 5,111,593 A | | 5/1992 | Gehen, Sr. | ..................... 33/613 |
| 5,348,274 A | | 9/1994 | Breen | ............................. 269/3 |
| 5,361,509 A | | 11/1994 | Wheeler, Sr. et al. | .......... 33/528 |
| 5,491,901 A | | 2/1996 | Parrind | ......................... 33/528 |
| 5,630,281 A | | 5/1997 | Pledger et al. | ................. 33/528 |
| 5,758,430 A | | 6/1998 | Holloway | ..................... 33/528 |
| 5,921,522 A | | 7/1999 | Weber | ......................... 248/544 |
| 5,966,828 A | | 10/1999 | Hickey | ......................... 33/528 |
| 5,992,036 A | | 11/1999 | Cannelli, Jr. | .................. 33/528 |
| 6,233,838 B1 | | 5/2001 | Falwell et al. | ................. 33/528 |
| 2002/0184778 A1 | * | 12/2002 | Yrazabal | ....................... 33/528 |

* cited by examiner

*Primary Examiner*—G. Bradley Bennet

(57) ABSTRACT

An electrical box locator for locating at least one electrical box on a stud, which electrical box locator includes a base plate and a pair of fixed stud flanges for engaging the stud; at least one stationary flange provided on the base plate for engaging a first end of an electrical box; and at least one adjustable flange adjustably carried by the base plate for engaging a second end of the electrical box.

12 Claims, 4 Drawing Sheets

ELECTRICAL BOX LOCATOR

CROSS-REFERENCE TO RELATED APPLICATIONS

Figures 1, 2:
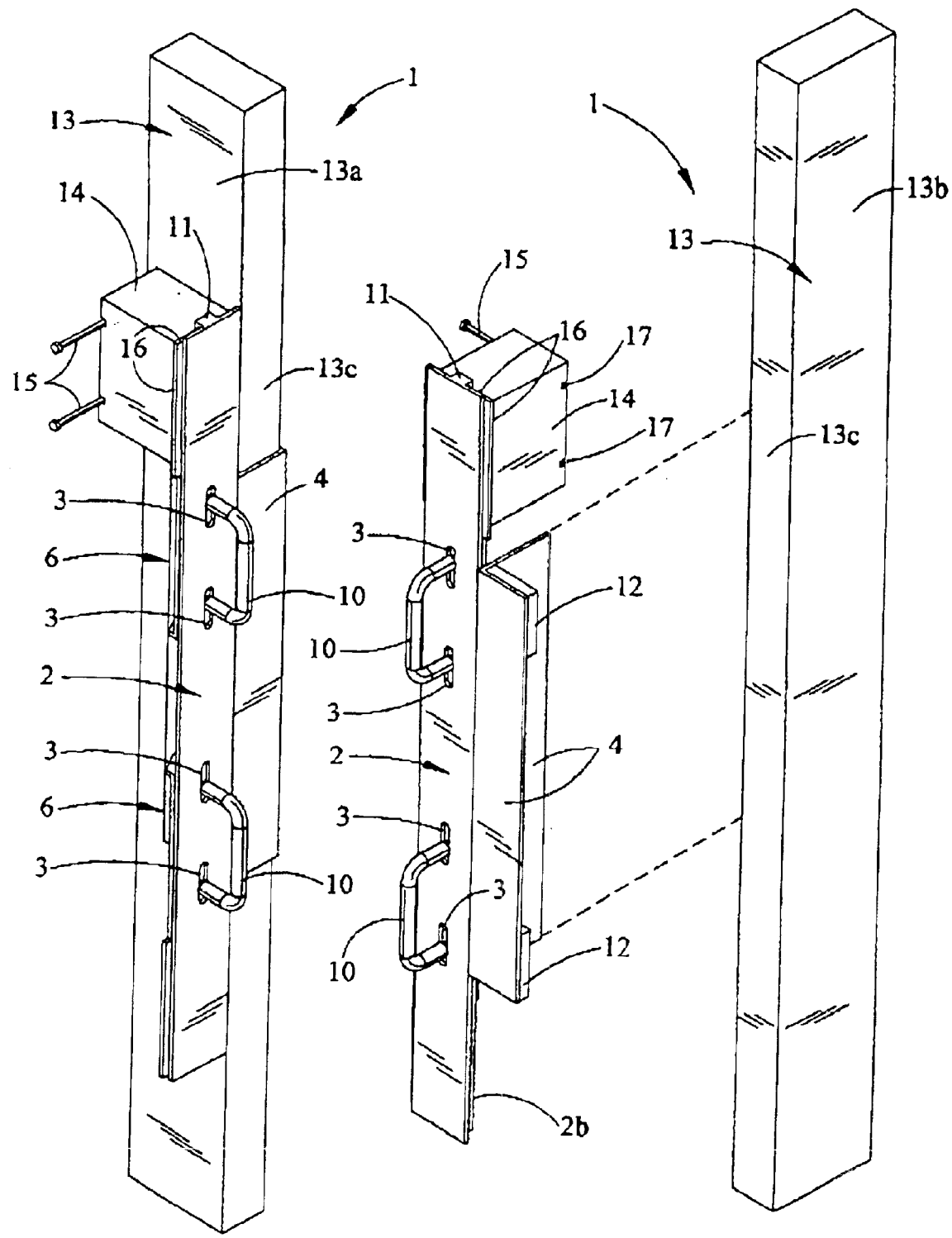

This application claims the benefit of and incorporates by reference prior filed U.S. Provisional Application Ser. No. 60/409,712, filed Sep. 12, 2002.

BACKGROUND OF THE INVENTION

Field of the Invention

The present invention relates to devices for locating electrical boxes such as electrical switch boxes and electrical socket boxes with respect to a wall or ceiling stud for attachment of the electrical boxes to the stud. More particularly, the present invention relates to an electrical box locator which is capable of locating one or two electrical boxes on a stud and temporarily holding the electrical boxes against the stud while the box or boxes is/are attached to the stud. In a preferred embodiment, the electrical box locator of the present invention includes a base plate for engaging the stud, at least one stationary flange provided on the base plate for engaging a first end of an electrical box, and at least one adjustable flange adjustably carried by the base plate for engaging a second end of the electrical box.

In a "roughing in" stage of building, houses and some commercial buildings are constructed by erecting wall frames on a foundation before paneling the wall frames with paneling, plywood or sheetrock. The interior and exterior wall frames usually include multiple, vertical wooden studs, typically two-by-four wooden studs, which extend between floor or toe plates and top plates and are horizontally spaced with respect to each other. After the studs are in place, electrical outlet boxes and switch boxes are attached to the studs, usually by nailing the electrical boxes to the studs. Care must be taken to insure that proper spacing is allowed on the stud to compensate for the thickness of plywood or sheetrock coverings. Electrical wiring is extended from the electrical boxes through conduits or insulated plastic sheaths which extend through openings in the studs. Finally, the wiring is enclosed in the walls by typically nailing the paneling, sheetrock or plywood panels to the studs.

During "roughing in" of the walls, builders typically determine the correct vertical locations of electrical boxes on the studs by measuring upwardly from the floor. A second measurement is typically made to determine how far the front end of the electrical boxes must extend beyond the front surface of the studs, depending on the thickness of the sheetrock or plywood panel material. After these measurements have been made, the electrical box is nailed in place on the stud. The electrical boxes must be held in the correct position on the stud as the nails are driven into the stud to attach the electrical box to the stud.

SUMMARY OF THE INVENTION

The present invention is directed to an electrical box locator for locating at least one electrical box on a stud, which electrical box locator includes a base plate and a pair of fixed stud flanges for engaging the stud; at least one stationary flange provided on the base plate for engaging a first end of an electrical box; and at least one adjustable flange adjustably carried by the base plate for engaging a second end of the electrical box.

DESCRIPTION OF THE PREFERRED EMBODIMENTS

Figures 5, 6:
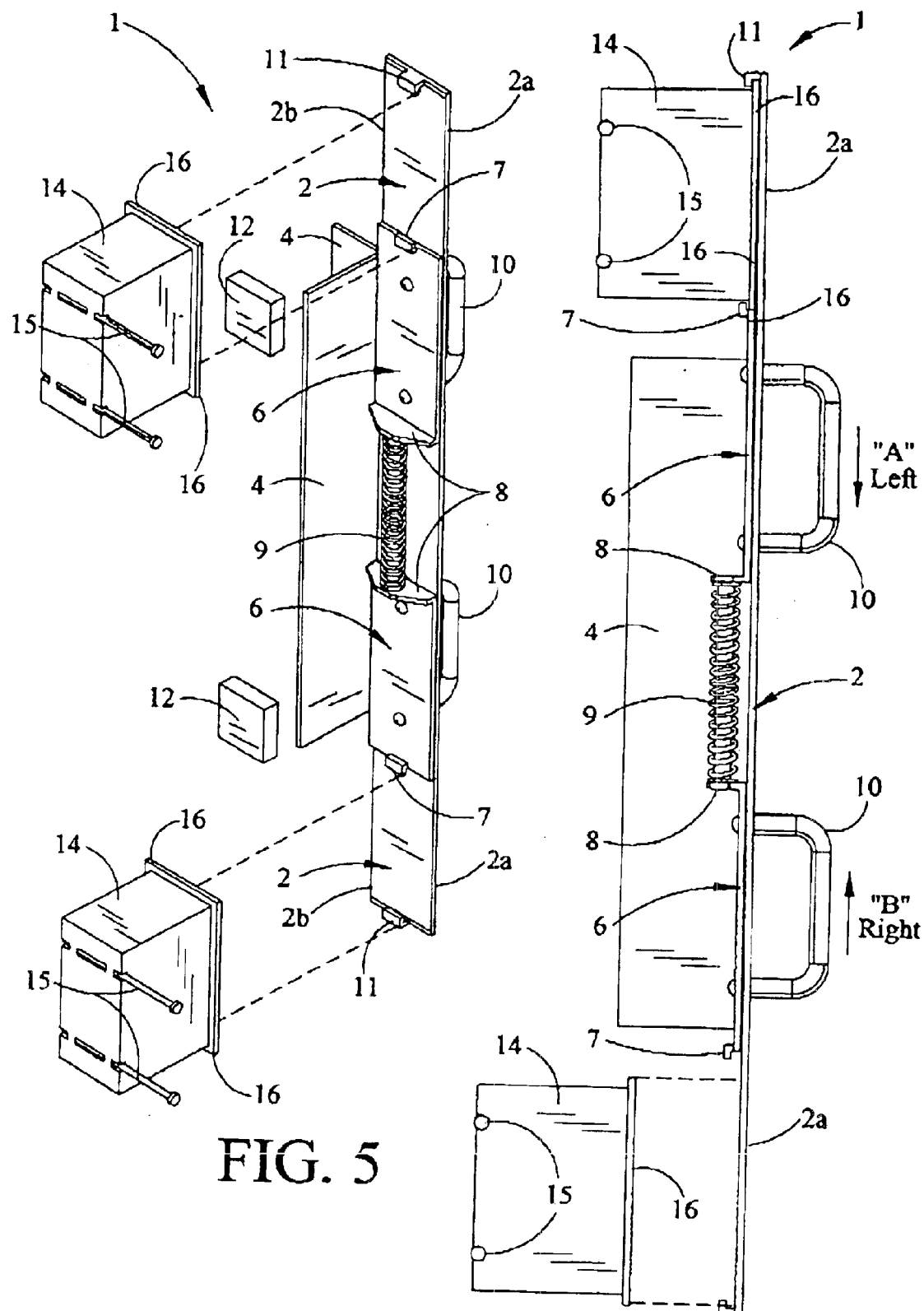
Figure 7:
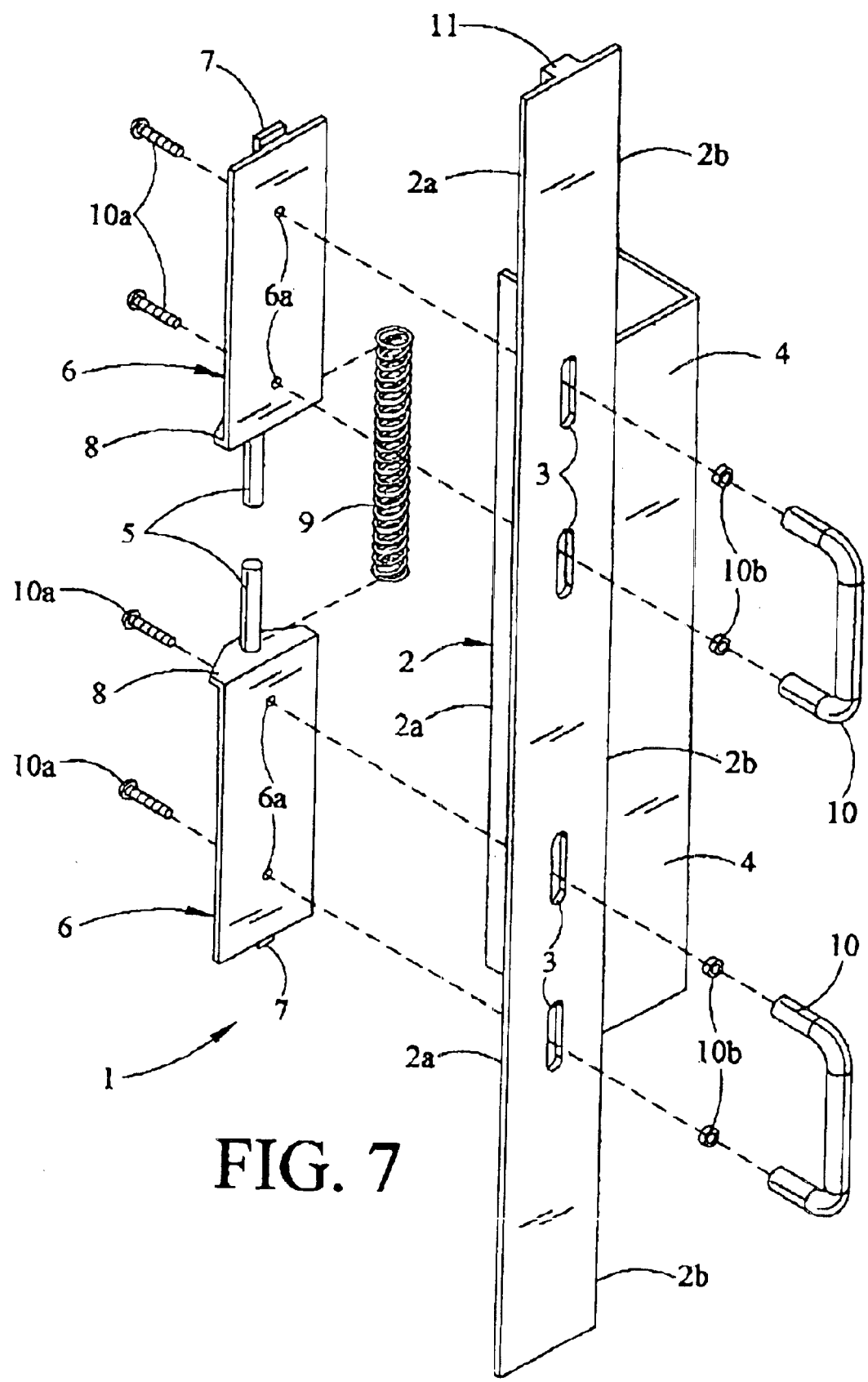

Referring initially to FIGS. 5–7 of the drawings, an illustrative embodiment of the electrical box locator of the present invention is generally indicated by reference numeral 1. The electrical box locator 1 includes a typically elongated, rectangular, flat base plate 2, having a front edge 2a and a rear edge 2b. Each end of the base plate 2 is provided with an L-shaped, inwardly-extending stationary flange 11. As shown in FIG. 5, a pair of perpendicular stud flanges 4 extends from the rear edge 2b of the base plate 2 for purposes which will be hereinafter described. As illustrated, one of the stud flanges 4 is typically coplanar with the flat base plate 2, whereas the other of the stud flanges 4 is typically perpendicular with respect to the base plate 2. At least one, and typically, two adjusting plates 6 is slidably mounted on the base plate 2. Accordingly, as illustrated in FIG. 7, two pairs of spaced-apart, elongated handle slots 3 typically extend through the base plate 2. Opposite ends of a typically U-shaped adjusting handle 10 extend through respective ones of the handle slots 3 of each corresponding pair of handle slots 3. The ends of the adjusting handle 10 are attached to the corresponding adjusting plate 6, which slidably engages the base plate 2, typically by extending threaded handle fasteners 10a through respective plate openings 6a in the adjusting plate 6 and threading the handle fasteners 10a through nuts 10b provided in the respective end portions of each handle 10. An adjustable flange 7 extends from one end of each adjusting plate 6, toward a corresponding stationary flange 11 at the corresponding end of the base plate 2. A spring mount flange 8 (FIG. 5) extends from the opposite end of each adjusting plate 6, and an elongated spring mount 5 (FIG. 7) extends from each spring mount flange 8, toward the spring mount 5 on the opposite adjusting plate 6. A tensioning spring 9 is typically attached to and extends between the spring mount flange 8 on one of the adjusting plates 6 and the spring mount flange 8 on the other adjusting plate 6, with the spring mounts 5 of the respective adjusting plates 6 extending into respective ends of the tensioning spring 9. Accordingly, as illustrated in FIGS. 5 and 6, the tensioning spring 9 normally biases the adjusting plates 6 away from each other, such that the adjustable flanges 7 are disposed in minimally-spaced relationship with respect to the respective and corresponding stationary flanges 11. A pair of spacer plates 12 (FIG. 5) may be mounted on the stud flange 4 which is coplanar with the base plate 2, for purposes which will be hereinafter described.

Referring next to FIGS. 1–6 of the drawings, in typical application the electrical box locator 1 is used to position one or a pair of electrical boxes 14 against a vertical wall stud 13 and hold the electrical boxes 14 in place during attachment of the electrical boxes 14 to the wall stud 13. Accordingly, as shown in FIG. 5, each electrical box 14 typically includes a box flange 16 which extends around the front perimeter of the electrical box 14. One of the electrical boxes 14 is initially removably attached to the electrical box locator 1 by first sliding an adjusting plate 6 away from the adjacent stationary flange 11 against the bias imparted by the tensioning spring 9, using the handle 10. The adjusting plate 6 is held in place against the tensioning spring 9 in order to provide sufficient space between the adjustable flange 7 and the stationary flange 11 for placement of the electrical box 14 therebetween. Next, the portion of the box flange 16 at one end of the electrical box 14 is inserted beneath the stationary flange 11 of the base plate 2. Upon release of the adjusting handle 10, the tensioning spring 9 pushes the adjusting plate 6 back to the original position on the base plate 2 to cause firm engagement of the adjustable flange 7 with the portion of the box flange 16 at the opposite end of the electrical box 14. In the event that two of the electrical boxes 14 are to be attached to the stud 13, this procedure is repeated to mount the second electrical box 14 on the opposite end of the base plate 2. However, it is understood that under normal circumstances a single box is secured in the top adjusting plate 6 for mounting on the wall stud 13.

Figures 3, 4:
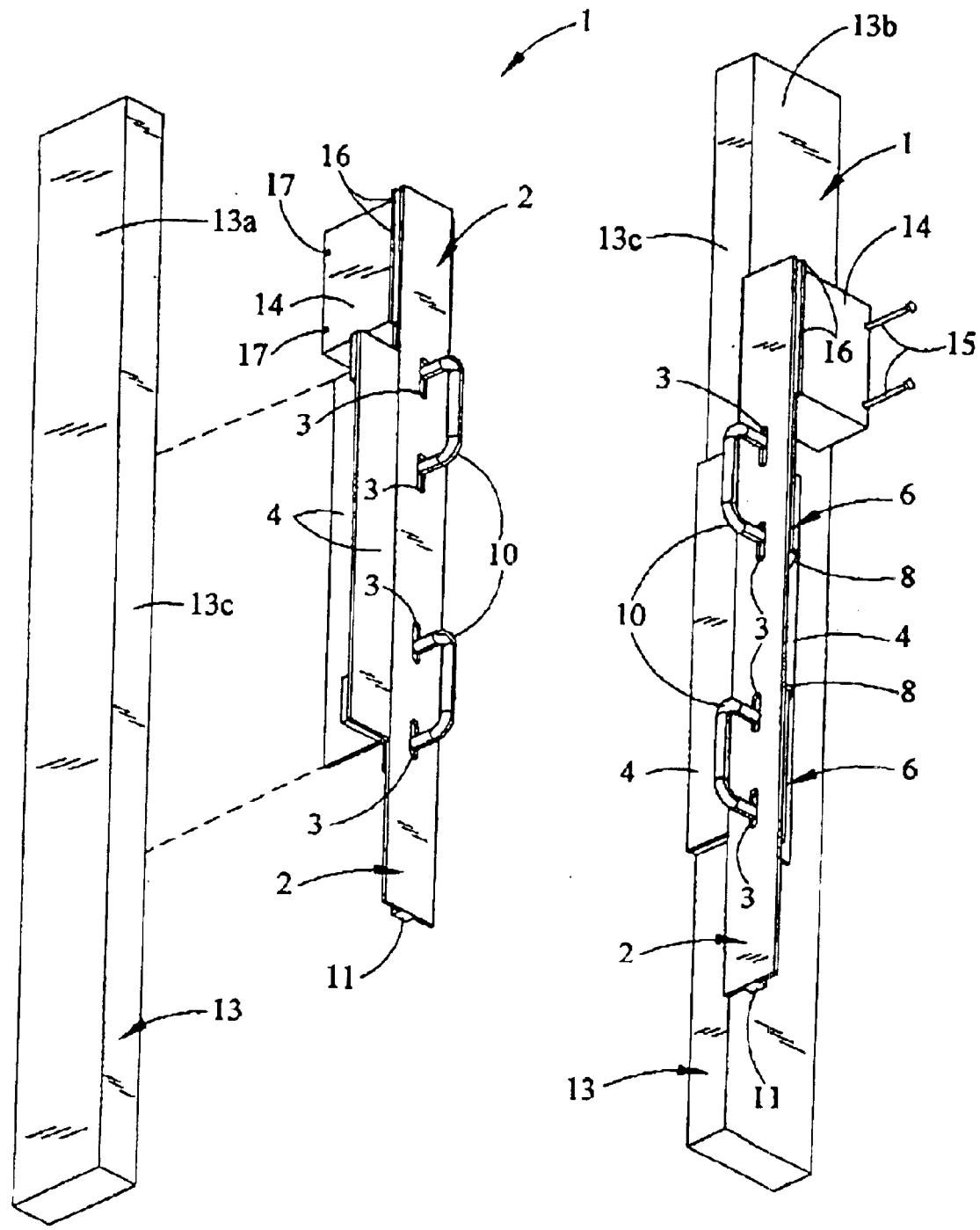

As illustrated in FIGS. 1–4, when mounted on the electrical box locator 1 in the manner heretofore described, the electrical box or boxes 14 may be mounted either on the left-hand side 13a of the wall stud 13, as shown in FIGS. 1 and 2, or, after reversal from top to bottom, on the right-hand side 13b of the wall stud 13, as shown in FIGS. 3 and 4. The nails 15 have been pre-inserted into the respective nail openings 17 provided along the rear edge of the electrical box 14. Next, the stud flanges 4 are pressed against the stud 13, with one of the stud flanges 4 engaging the left surface 13a of the stud 13 and the other of the stud flanges 4 engaging the front surface 13c of the stud 13, as illustrated in FIG. 2, to facilitate attaching the electrical box 14 to the left surface 13a of the stud 13. This positions the electrical box 14 against the left surface 13a of the stud 13. The electrical box 14 is positioned against and attached to the right surface 13b of the stud 13, as desired, by reversing the vertical orientation of the electrical box locator 1 and causing the stud flanges 4 to engage the right surface 13b of the stud 13, as illustrated in FIG. 3. In each case, under circumstances where sheetrock (not illustrated) is to be installed on the stud 13, the spacer plates 12 are used on the indicated stud flange 4 to extend and space the electrical box 14 beyond the front surface 13C of the stud 13 as the nails 15 are driven into the stud 13, to accommodate the sheetrock. After the electrical box 14 is positioned against the stud 13, the nails 15 are driven into the stud 13 to nail the electrical box 14 to the stud 13. Finally, the electrical box locator 1 is removed from the electrical box 14 by first sliding the adjusting plate 6 away from the electrical box 14, against the bias imparted by the tensioning spring 9, to disengage the adjustable flange 7 of the adjusting plate 6 from the box flange 16 of the electrical box 14. Next, the stationary flange 11 is disengaged from the box flange 16 at the opposite end of the electrical box 14 by moving the bottom end of the electrical box locator 1 outwardly and complete removal of the electrical box locator 1 from the electrical box 14.

It is understood that the electrical box locator 1 can be used without the stud flanges 4 or either one of them, on the base 2 to mount or install one or more electrical boxes 14. However, in a most preferred embodiment of the invention both stud flanges 4 are useful to engage the wall stud 13 and better stabilize the electrical box locator 1 in place on the wall stud 13.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. An electrical box locator for locating at least one electrical box on a stud, comprising:
    a base plate for engaging the stud;
    at least one stationary flange provided on said base plate for engaging a first end of the electrical box;
    at least one adjusting plate slidably engaging said base plate;
    at least one late flange carried by said adjusting plate for engaging a second end of the electrical box in a first position of said plate flange and disengaging the second end of the electrical box in a second position of said plate flange;
    at least one adjusting handle carried by said at least one adjusting plate, respectively, and
    a tensioning mechanism engaging said at least one adjusting plate for biasing said at least one plate against the electrical box.

2. The electrical box locator of claim 1 comprising a pair of stud flanges provided on said base plate for engaging the stud.

3. The electrical box locator of claim 1 wherein said tensioning mechanism comprises a tensioning spring.

4. The electrical box locator of claim 3 comprising a pair of stud flanges provided on said base plate for engaging the stud.

5. An electrical box locator for locating electrical boxes on a stud, comprising:
    a base plate for engaging the stud;
    a first stationary flange provided on said base plate for engaging a first end of a first electrical box;
    a second stationary flange provided on said base plate for engaging a first end of a second electrical box;
    a first adjustable flange adjustably carried by said base plate for engaging a second end of the first electrical box in a first position of said first adjustable flange and disengaging the second end of the first electrical box in a second position of said first adjustable flange; and
    a second adjustable flange adjustably carried by said base plate for engaging a second end of the second electrical box in a first position of said second adjustable flange and disengaging the second end of the second electrical box in a second position of said second adjustable flange.

6. The electrical box locator of claim 5 comprising a first adjusting plate adjustably engaging said base plate and a first adjusting handle carried by said first adjusting plate, and wherein said first adjustable flange is carried by said first adjusting plate; and a second adjusting plate adjustably engaging said base plate and a second adjusting handle carried by said second adjusting plate, and wherein said second adjustable flange is carried by said second adjusting plate.

7. The electrical box locator of claim 5 comprising a pair of stud flanges provided on said base plate for engaging the stud and at least one spacer plate provided on one of said stud flanges for adjusting the position of the electrical box on the stud.

8. The electrical box locator of claim 7 comprising a first adjusting plate adjustably engaging said base plate and a first adjusting handle carried by said first adjusting plate, and wherein said first adjustable flange is carried by said first adjusting plate; and a second adjusting plate adjustably engaging said base plate and a second adjusting handle carried by said second adjusting plate, and wherein said second adjustable flange is carried by said second adjusting plate.

9. The electrical box locator of claim 6 comprising a tensioning spring spanning said first adjusting plate and said second adjusting plate for biasing said first adjustable flange in said second position of said first adjustable flange and said second adjustable flange in said second position of said second adjustable flange.

10. The electrical box locator of claim 9 comprising a pair of stud flanges provided on said base plate for engaging the stud.

11. An electrical box locator for locating electrical boxes on a stud, comprising:

a base plate for engaging the stud;

a first stationary flange provided on said base plate for engaging a first end of a first electrical box;

a second stationary flange provided on said base plate for engaging a first end of a second electrical box;

first and second adjusting plates slidably carried by said base plate;

a first adjustable flange carried by said first adjusting plate for engaging a second end of the first electrical box in a first position of said first adjustable flange and disengaging the second end of the first electrical box in a second position of said first adjustable flange; and a second adjustable flange carried by said second adjusting plate for engaging a second end of the second electrical box in a first position of said second adjustable flange and disengaging the second end of the second electrical box in a second position of said second adjustable flange.

12. The electrical box locator of claim 11 comprising a tensioning spring spanning said first adjusting plate and said second adjusting plate for biasing said first adjustable flange in said second position of said first adjustable flange and said second adjustable flange in said second position of said second adjustable flange.

* * * * *